June 30, 1970  L. F. SCHMID  3,517,572

DIFFERENTIAL HANDBRAKE

Filed Jan. 24, 1968  3 Sheets-Sheet 1

LEOPOLD F. SCHMID
INVENTOR,

BY

Karl G. Ross
Attorney

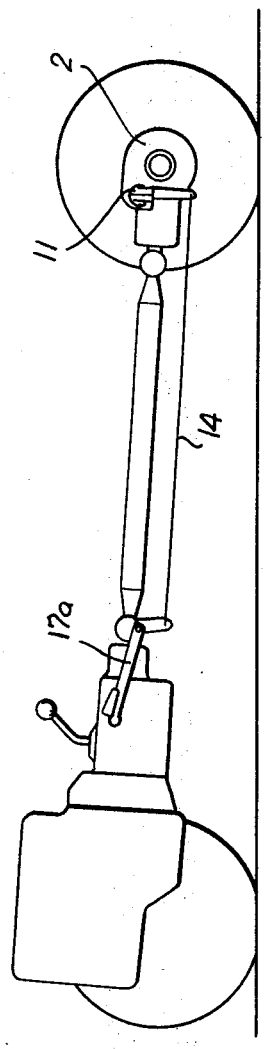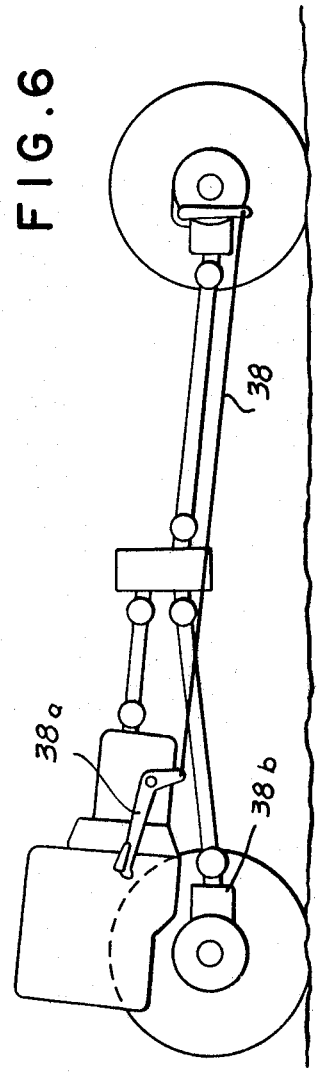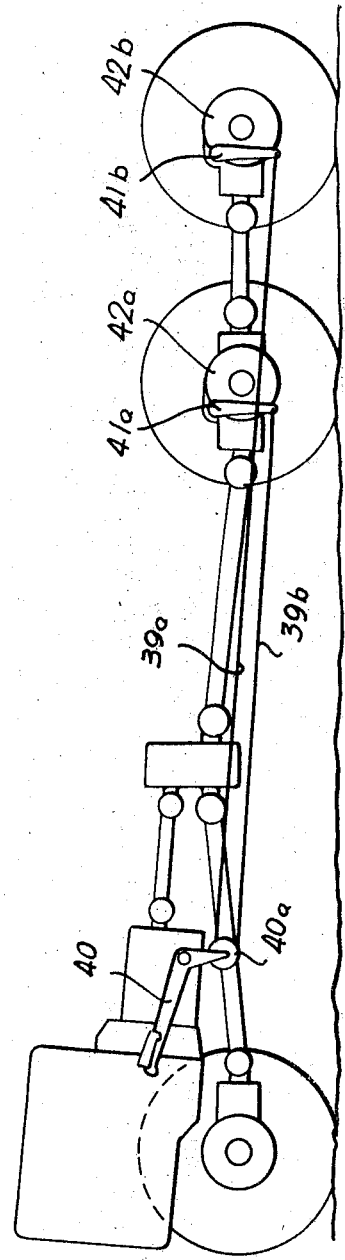

June 30, 1970  L. F. SCHMID  3,517,572
DIFFERENTIAL HANDBRAKE

Filed Jan. 24, 1968  3 Sheets-Sheet 3

INVENTOR.
LEOPOLD F. SCHMID
BY
Karl F. Ross
Attorney

United States Patent Office 3,517,572
Patented June 30, 1970

3,517,572
DIFFERENTIAL HANDBRAKE
Leopold Franz Schmid, Stuttgart, Germany, assignor to Alfred Teves GmbH, Frankfurt, Germany, a corporation of Germany
Filed Jan. 24, 1968, Ser. No. 700,249
Claims priority, application Germany, Jan. 25, 1967, T 33,066
Int. Cl. F16h *11/00;* F16d *59/00*
U.S. Cl. 74—710.5         9 Claims

ABSTRACT OF THE DISCLOSURE

A manually operated auxiliary handbrake for automotive vehicles acts upon the differential which is provided with an automatically operable brake device interposed between the differential housing and at least one of the wheel shafts. Action of the handbrake is independent of the action of the conventional vehicle footbrake and makes use of a band engaging a flange of the differential casing.

---

The invention relates to a braking system for an automotive vehicle and, more particularly, to an auxiliary, manually operated "handbrake" adapted to be used independently of the usual hydraulic footbrake.

In prior art the arresting effect of handbrakes on the wheels of vehicles parked on an incline has often been inadequate, particularly if only one wheel had traction on the pavement and the other had no traction (e.g. as on a slippery surface such as ice). Moreover, conventional handbrakes may become ineffective through moisture absorbed by the brake lining following travel on a wet road or, for example in the case of military vehicles, following the traverse of shallow streams.

It is an object of my present invention to overcome the disadvantages of prior automobile handbrakes by providing a mechanism which is reliable and safe for all normal road-surface conditions.

Another object of my invention is to safeguard the efficiency of such handbrakes against water, dirt and other potentially disabling elements of the environment.

Still another object of the invention is to provide an improved handbrake of economic and simple construction which requires a lesser number of parts than are needed for the construction of a conventional handbrake system.

These objects and others which will become apparent hereinafter are attained, in accordance with the present invention, in a manually operated mechanical (i.e. non-hydraulic) handbrake acting upon a member of the differential gear assembly and being reinforced with respect to the braking effect, by novel self-locking automatic means interposed between the differential housing and at least one of the wheel shafts; such means may include a friction brake or the like limiting the slip of the differential.

According to one version of my invention, such locking takes effect through the frictional cohesion between two surfaces on the outside of the planetary-gear casing. Their cohesion is a function of the predetermined angle of orientation of these surfaces relative to each other, and increases in direct proportion to the force with which they are compressed. This system may result in a 40% saving of brake parts and, because the differential casing is thoroughly sealed, allows the vehicle to travel through water etc.

In another version of my invention the locking device comprises a wedge-shaped spring-mounted brakeshoe which is forced into frictional contact with a surface rotating with one of the wheelshafts.

Either of the locking devices strengthens the braking effect and is applicable for vehicles with front- or rear-wheel drives.

The operation of a handbrake system of my invention is simple and requires, for two-axle vehicles, only one control lever and one cable. Three-axle vehicles, with two axles to be under control, need one control lever and two cables or a cable connecting the control levers. The provision of the emergency, parking, or locking mechanical brake with the sealed differential housing prevents any external contaminants from affecting the brake.

The above and other objects, features and advantages of my invention will become more readily apparent from the following description, reference being made to the accompanying drawing in which:

FIG. 3 is a schematic side view showing the applicability of the handbrake according to my invention to a two-axle vehicle;

FIG. 6 is a schematic side view showing the applicability of a handbrake according to my invention to another two-axle vehicle with forward-wheel drive; and FIG. 7 is a schematic side view showing the applicability of a handbrake according to my invention to a three-axle vehicle.

Figure 1:
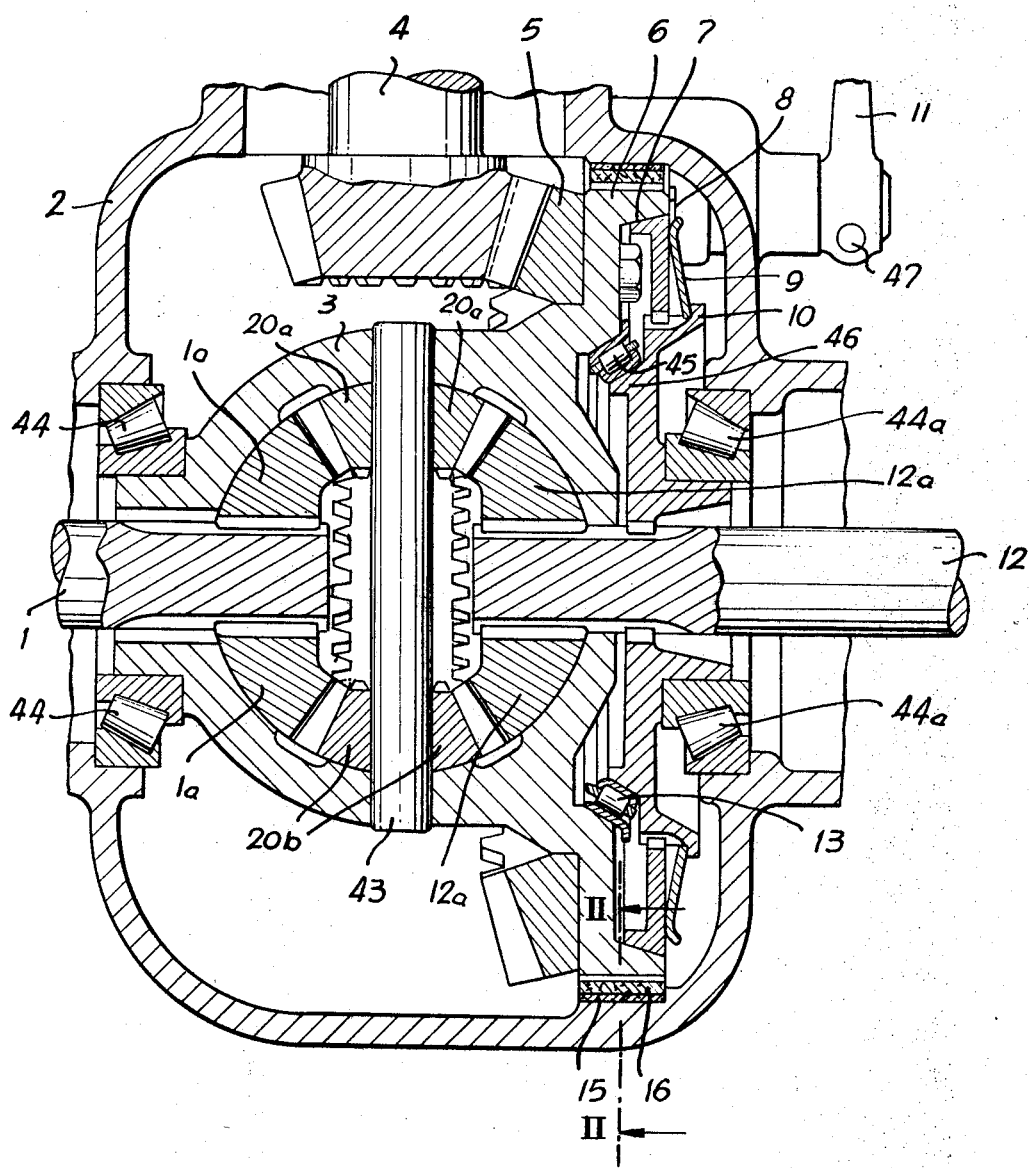
FIG. 1 is a transverse cross-sectional view of a handbrake according to my invention.

In FIG. 1 of the drawing there is shown the sealed differential housing 2 which admits the drive shaft 4, the wheel shafts or axles 1 and 12 respectively, and the brake-control member 11 in the form of a lever. Packing in the form of sealing rings tightly seals off the points of entry of these parts, to exclude moisture, dirt and other foreign and potentially disabling material. The differential casing 3 inside the housing 2 is rotatably supported at one axial end by tapered roller bearings 44 mounted at an angle relative to the axis of the wheel shaft 1. The differential assembly inside the casing 3 consists of the planetary gears 20a, 20b, the sun gears 1a and 12a which rotate the wheel shafts 1, 12, and the planetary shaft 43 carrying the gears 20a and 20b at right angles to the common axis of the wheel shafts or axles 1, 12 which are splined to the differential sun gears.

Figure 5:
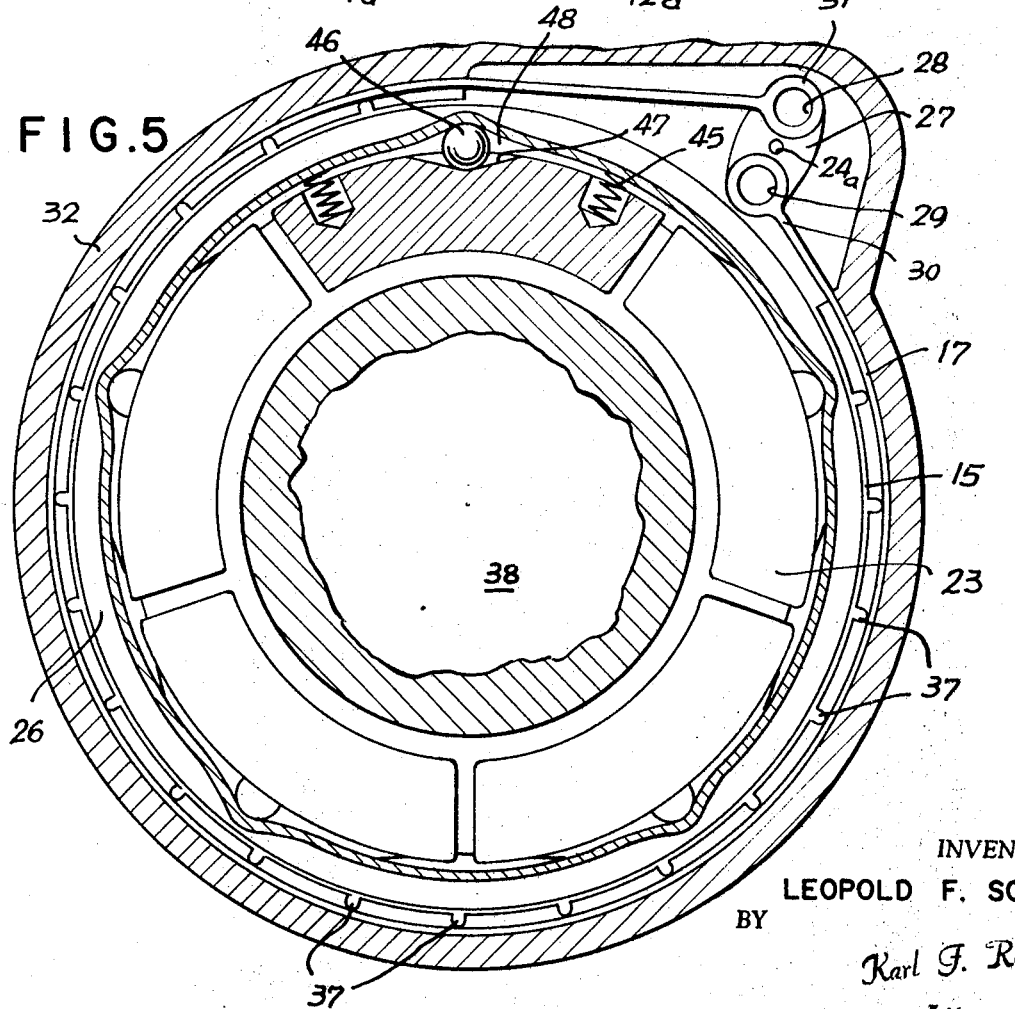
FIG. 5 is an enlarged longitudinal cross-sectional view taken on the line V—V of FIG. 4.

The disk-like flange 21 of the differential casing 3 lies in an approximately radial plane and is provided, on that portion of its surface which faces the drive shaft 4, with a ring gear 5 in mesh with the pinion 4a of the drive shaft. The cylindrical flange rim 6, formed on the flange 21, at right angles to the surface bearing the ring gear 5, is coaxial with the wheel shafts 1, 12. As shown in FIG. 5, the brake band 17 is looped around the ring flange 6 in a loop of at least 270 angular degrees in order to distribute the braking effect over the largest feasible surface. The two ends 30 and 31 of the brake band are attached to the diametrically opposite ends 28 and 29, respectively, of the lever plate 27 which is swingable about the pivot shaft 24a, whose axis is parallel to that of the wheel shafts.

Figure 2:
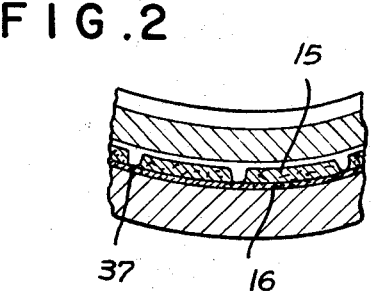
FIG. 2 is an enlarged longitudinal cross-sectional view taken on the line II—II of FIG. 1.

As shown in FIG. 2, the brake band consists of a metal strip 16 lined with an elongated pad of friction material 15 on that side which faces the rim flange 6. Rotation of the lever 27, according to the illustration of FIG. 5, draws the friction band 15, 16 against the ring flange or releases the frictional engagement. A plurality of angularly equispaced inwardly open axial grooves 37 in the lining, distributed at equal intervals about its circumference, spread lubricant in the housing 2 evenly over the rim surface.

The slip-limiting automatic lock of the differential comprises an inner tapered surface 7 of the rim flange 6 which is engaged by a correspondingly tapered surface of the brake ring 8 under pressure of a disk-shaped spring element 9. The spring element 9 is supported on an outer arm of a disk 46 which is braced against the differential housing 3 by the self-centering roller bearings 46, and against the brake housing 2 by the tapered roller bearings 44a. The disk 46 is also splined to the wheel shaft 12.

The frictional cohesion between the tapered plane 7 of the disk-extension 21, and the adjacent tapered surface area of the brake ring 8 frictionally locks both elements and limits the slip of the differential.

Figure 4:
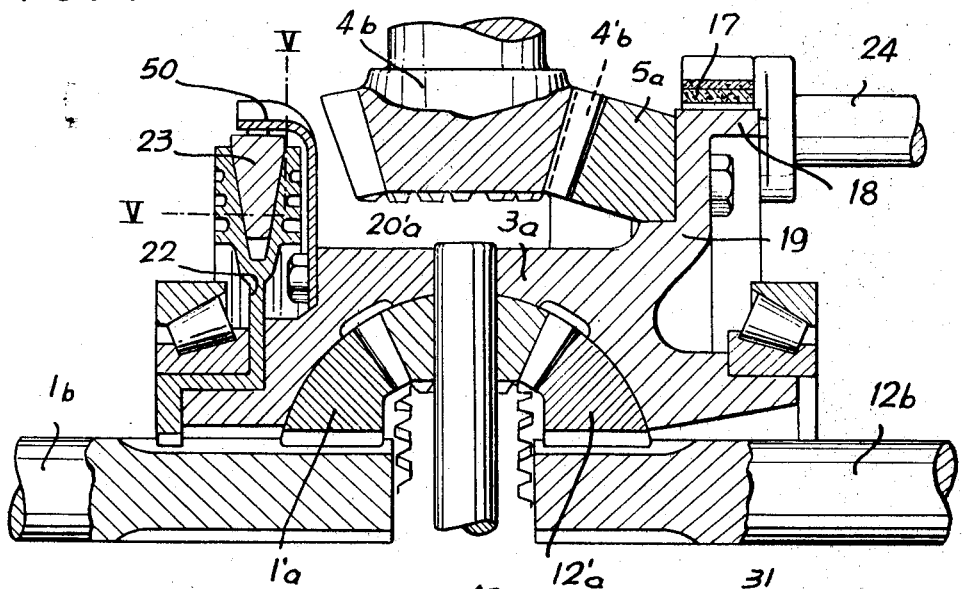
FIG. 4 is a transverse cross-sectional view showing part of an alternate automatic limited-slip means for the assembly of FIG. 1.

An alternative locking device is illustrated in FIGS. 4 and 5, where the axle shafts of the wheels are shown at 1b and 12b, the drive shaft at 4b, the drive pinion at 4b' the ring gear at 5a, the brake band at 17, the control lever at 24, the rim flange at 18, the disk-like flange at 19, the differential casing at 3a, and the gearing at 1a', 20a' and 12a' respectively, all as previously described. The automatic locking device here consists of a cone-shaped element 23 formed as a rim of the ring 22 which is splined to the wheel shaft 1b. The angularly spaced inwardly tapered segmental brakeshoes are connected to a ring-shaped extension 50 on the outside of the differential casing 3a. The brake force is intensified by rollers or balls 46 which cooperate with the ramp surfaces 47 and 48 and cam the brakeshoes inwardly with increased relative displacement of casing 3a and shaft 1b. Through this device the differential housing is rendered slip-limiting.

In FIG. 3 there is shown an example of the external mechanism for setting or releasing the brake system according to my invention. A lever 17a is manually operated and connected through the cable or Bowden line 14 with the control lever 11 on the outside of the differential housing 2 of the rear-wheel shafts. FIG. 6 shows a corresponding arrangement for a vehicle with front-wheel drive, such as a truck, where the manually operated lever 38a is located at the driver's seat and is connected to lever 11 via cable 38; the brake may be also provided at the front-wheel differential 38b.

As shown in FIG. 7, the system for a three-axle vehicle is manipulated by one lever 40 to which a cable 39a, 39b is attached through a pulley 40a, the cable leading to the control levers 41a and 41b on the outside of the housings 42a and 42b respectively. Each differential housing is provided with a respective brake system as previously described.

I claim:
1. In an automotive vehicle having a differential connecting a driven shaft to a pair of coaxial driven axles, connected with driven wheels of the vehicle, the differential having a differential housing, a gear-carrying casing rotatable in said housing, and a pair of driven gears in said housing connected respectively with said axles and driven upon rotation of the said casing, the improvement wherein said housing is sealed against contamination from the exterior and which comprises a mechanically operable brake within said housing for preventing rotation of the driven wheels, said mechanically operable brake includes a rotary actuating shaft extending sealingly through said housing and into the exterior thereof, an outwardly extending flange formed on said casing and having a cylindrical outer surface coaxial with said driven axles, and a brake band on said housing surrounding said surface and connected to said actuating shaft for application to said flange to brake rotation of said casing relative to said housing; and automatically operable means within said housing for restricting rotation of one of said driven axles relatively to said casing, said automatically operable means including a frustoconical brake surface formed on said casing and a frustoconical brake member rotatably entrained by one of said axles adjacent said casing and frictionally engageable with and complementary to said frustoconical brake surface, and spring means for urging said frustoconical surface and said member into frictional engagement, said actuating shaft having a lever swingably mounted in said housing and coupled with opposite ends of said band, said vehicle having a brake-control member in the region of the driver's seat of the vehicle and a Bowden line connecting said brake-control member with said lever.

2. The improvement defined in claim 1 wherein said casing forms a planetary-gear carrier having at least two planetary gears rotatable therein about an axis perpendicular to the axis of the said axles, said casing being rotatable about the axis of said axles, said driven gears forming sun gears meshing with said planetary gears, said flange being rotatable in a plane perpendicular to said axis of said axles and formed with a ring gear, said power shaft having a pinion meshing with said ring gear, said flange being formed with an axially extending cylindrical rim forming said cylindrical surface, said brake band extending around said ring and hugging said rim over an arc of at least 270°, said band having a surface engageable with said rim and formed with a plurality of angularly spaced axially extending grooves open in the direction of said rim.

3. In an automotive vehicle having a differential connecting a driven shaft to a pair of coaxial driven axles, connected with driven wheels of the vehicle, the differential having a differential housing, a gear-carrying casing rotatable in said housing, and a pair of driven gears in said housing connected respectively with said axles and driven upon rotation of the said casing, the improvement wherein said housing is sealed against contamination from the exterior and which comprises a mechanically operable brake within said housing for preventing rotation of the driven wheels, said mechanically operable brake includes a rotary actuating shaft extending sealingly through said housing and into the exterior thereof, an outwardly extending flange formed on said casing and having a cylindrical outer surface coaxial with said driven axles, and a brake band on said housing surrounding said surface and connected to said actuating shaft for application to said flange to brake rotation of said casing relative to said housing; and automatically operable means within said housing for restricting rotation of one of said driven axles relatively to said casing, said automatically operable means including a frustoconical brake surface formed on said casing and a frustoconical brake member rotatably entrained by one of said axles adjacent said casing and frictionally engageable with and complementary to said frustoconical brake surface, and spring means for urging said frustoconical surface and said member into frictional engagement, the vehicle having two pairs of driven wheels in tandem, each pair of driven wheels being provided with a respective differential sealed against contamination from the exterior and having a respective mechanically operable brake and a respective automatically operable means as set forth, each of said mechanically operable brakes having a respective control lever coupled with the respective brake band and mounted on the actuating shaft in the respective differential casing for swinging movement about respective axes parallel to the axes of the associated wheel axles, said vehicle being further provided with a control lever in the region of the driver's seat of the vehicle, said control lever being formed with a pulley and a single flexible cable connecting said levers and passing around said pulley.

4. In an automotive vehicle having a differential connecting a driven shaft to a pair of coaxial driven axles, connected with driven wheels of the vehicle, the differential having a differential housing, a gear-carrying casing rotatable in said housing, and a pair of driven gears in said housing connected respectively with said axles and driven upon rotation of the said casing, the improvement which comprises a mechanically operable brake within said housing for preventing rotation of the driven wheels; automatically operable means for restricting rotation of one of said driven axles relatively to said casing, said mechanically operable brake including a brake member mounted on said housing and frictionally engageable with said casing, said casing forming a planetary-gear carrier having at least two planetary gears rotatable therein about an axis perpendicular to the axis of the said axles, said casing being rotatable about the axis of said axles, said driven gears forming sun gears meshing with said planetary gears, said casing comprising an annular radial flange rotatable in a plane perpendicular to said axis of said axles and formed with a ring gear, said power shaft having a pinion meshing with said ring gear, said member being engageable with said flange, said flange being formed with an axially extending cylindrical rim coaxially with said axles, said member forming at least one radially movable friction pad engageable with said ring, and including a brake band provided with said pad and extending at least partly around said ring, said mechanically operable locking brake comprising actuating means connected with at least one end of said band for drawing same against said rim of said flange, said housing being sealed against contamination from the exterior and said flange and said rim are formed at one axial end of said casing; and bearing means rotatably supporting said casing at opposite ends in said housing, said band being disposed in said housing in radial alignment and coaxially with said flange, said mechanically operable brake being formed with an actuating lever pivotally mounted in said housing for swinging movement about an axis parallel to the axis of said axles at a side of said housing corresponding to said one axial end of said casing, said lever being formed with an attachment plate connected to the opposite ends of said band on diametrically opposite sides of the axis of said lever, said vehicle being provided with a control lever in the region of the driver's seat and coupling means interconnecting said levers, said automatically operable means including a plate keyed to said one of said axles, a friction disk mounted on said plate and axially shiftable thereon within the perimeter of said rim, and spring means carried by said plate and urging said disk axially toward said flange, said flange and said disk being formed with complementary frustoconical friction surfaces frictionally interconnecting said casing and said one of said axles.

5. The improvement defined in claim 4 wherein said band, upon engagement with said rim, extends therearound and hugs said rim over an arc of at least 270°.

6. The improvement defined in claim 4 wherein said band has a surface engageable with said rim formed with a plurality of angularly spaced axially extending grooves open in the direction of said rim.

7. In an automotive vehicle having a differential connecting a driven shaft to a pair of coaxial driven axles, connected with driven wheels of the vehicle, the differential having a differential housing, a gear-carrying casing rotatable in said housing, and a pair of driven gears in said housing connected respectively with said axles and driven upon rotation of the said casing, the improvement which comprises a mechanically operable brake within said housing for preventing rotation of the driven wheels; automatically operable means for restricting rotation of one of said driven axles relatively to said casing, said mechanically operable brake including a brake member mounted on said housing and frictionally engageable with said casing, said casing forming a planetary-gear carrier having at least two planetary gears rotatable therein about an axis perpendicular to the axis of the said axles, said casing being rotatable about the axis of said axles, said driven gears forming sun gears meshing with said planetary gears, said casing comprising an annular radial flange rotatable in a plane perpendicular to said axis of said axles and formed with a ring gear, said power shaft having a pinion meshing with said ring gear, said member being engageable with said flange, said flange being formed with an axially extending cylindrical rim coaxially with said axles, said member forming at least one radially movable friction pad engageable with said ring, and including a brake band provided with said pad and extending at least partly around said ring, said mechanically operable locking brake comprising actuating means connected with at least one end of said band for drawing same against said rim of said flange, said housing being sealed against contamination from the exterior and said flange and said rim are formed at one axial end of said casing; and bearing means rotatably supporting said casing at opposite ends in said housing, said band being disposed in said housing in radial alignment and coaxially with said flange, said mechanically operable brake being formed with an actuating lever pivotally mounted in said housing for swinging movement about an axis parallel to the axis of said axles at a side of said housing corresponding to said one axial end of said casing, said lever being formed with an attachment plate connected to the opposite ends of said band on diametrically opposite sides of the axis of said lever, said vehicle being provided with a control lever in the region of the driver's seat and coupling means interconnecting said levers, said automatically operable means including a disk keyed to said one of said axles and formed with an annular groove with outwardly divergent flanks, said casing being provided with a plurality of inwardly convergent and angularly spaced brakeshoes receivable in said groove, spring means bearing upon said brakeshoes and urging same radially inwardly into said groove, and cam means between said shoes and said casing forcing said shoes into tighter engagement with said disk upon relative displacement of said casing and said one of said axles.

8. The improvement defined in claim 7 wherein said band, upon engagement with said rim, extends therearound and hugs said rim over an arc of at least 270°.

9. The improvement defined in claim 7 wherein said band has a surface engageable with said rim formed with a plurality of angularly spaced axially extending grooves open in the direction of said rim.

References Cited

UNITED STATES PATENTS

| 601,206 | 3/1898 | Hayes et al. | 188—77 X |
| 1,264,924 | 5/1918 | Headson | 188—77 X |
| 1,411,664 | 4/1922 | Kimmet et al. | 188—77 |
| 1,835,412 | 12/1931 | Livingood | 74—710.5 X |
| 1,882,037 | 10/1932 | Roberts | 188—77 |
| 2,415,293 | 2/1947 | Tourneau | 74—711 |
| 2,557,444 | 6/1951 | Tourneau | 74—710.5 X |
| 2,894,416 | 7/1959 | Scott | 74—710.5 |
| 3,073,424 | 1/1963 | Russell | 188—264 X |
| 3,086,620 | 4/1963 | Elfes | 188—75 |

FOREIGN PATENTS

| 826,911 | 1/1960 | Great Britain. |
| 927,924 | 6/1963 | Great Britain. |

DONLEY J. STOCKING, Primary Examiner

T. C. PERRY, Assistant Examiner

U.S. Cl. X.R.

74—711; 188—77, 264; 192—4